United States Patent
Hung et al.

(10) Patent No.: US 6,760,429 B1
(45) Date of Patent: Jul. 6, 2004

(54) WEB BASED AGENT BACKED SYSTEM THAT PROVIDES STREAMING MULTIMEDIA SUPPORT

(75) Inventors: Fung Hung, Plano, TX (US); David W. McKnight, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/512,185

(22) Filed: Feb. 22, 2000

Related U.S. Application Data

(60) Provisional application No. 60/173,030, filed on Dec. 23, 1999.

(51) Int. Cl.[7] .......................... G06F 15/16; H04L 12/28; H04L 12/66; H04M 1/64; H04M 3/523
(52) U.S. Cl. .................. 379/265.09; 370/352; 370/356; 370/401; 379/88.17; 379/210.01; 379/900; 709/206; 709/227
(58) Field of Search .................. 370/352, 353, 370/356, 401; 379/209.01, 210.01, 265.09, 900, 88.01, 88.13, 88.16, 88.17, 88.18; 709/200, 203, 206, 227

(56) References Cited

U.S. PATENT DOCUMENTS

| | | | | |
|---|---|---|---|---|
| 5,884,032 A | * | 3/1999 | Bateman et al. ............ | 709/204 |
| 5,991,394 A | * | 11/1999 | Dezonno et al. ........ | 379/265.09 |
| 6,188,762 B1 | * | 2/2001 | Shooster ................ | 379/265.09 |
| 6,192,050 B1 | * | 2/2001 | Stovall ........................ | 370/389 |
| 6,311,231 B1 | * | 10/2001 | Bateman et al. ........ | 379/265.09 |
| 6,430,282 B1 | * | 8/2002 | Bannister et al. ...... | 379/211.02 |
| 6,493,447 B1 | * | 12/2002 | Goss et al. ............ | 379/265.09 |

* cited by examiner

Primary Examiner—Harry S. Hong
(74) Attorney, Agent, or Firm—Bruce Garlick; Neil Motthew

(57) ABSTRACT

A web based agent backed system provides sales and service and sales support for a company. The system includes a call center computer (112) coupled to the Internet (or another packet switched network) (118) that receives a call request from a customer computer (104), which may have been made using a link contained in a company web page maintained on a web server (108). Upon receiving the call request, the call center computer (112) determines customer information and call information and connects an agent through agent station computer (114) for call servicing. The call center computer (114) completes an IP telephony call made by the customer computer (104) to an agent or assigns an agent to call the customer by placing an IP telephony call to the customer computer (114) or by placing a PSTN call to the customer's phone (106).

34 Claims, 6 Drawing Sheets

WEB BASED AGENT BACKED SYSTEM THAT PROVIDES STREAMING MULTIMEDIA SUPPORT

CROSS-REFERENCE TO RELATED APPLICATION

The present application claims priority pursuant to 35 U.S.C. Sec 119(e) to U.S. Provisional Application Serial No. 60/173,030, filed Dec. 23, 1999, which is hereby incorporated by reference in its entirety.

BACKGROUND

1. Technical Field

The present invention relates generally to the support of products and services; and more particularly to product and service support that includes agent backed services.

2. Related Art

In the sale of products and services, customer service is paramount. Without satisfactory customer sales support, many sales do not occur. Further, without satisfactory customer service support, repeat sales generally do not occur. Thus, companies expend great resources in supporting their products and services, both presale and post sale. Traditionally, a company sets up a sales department that assists potential customers presale and a customer service department that supports customers post sale. The sales department personnel typically visit customers, allow customers to visit and provide telephone support in making sales. Likewise, customer service personnel allow existing customers to visit and provide telephone support. However, it is unusual for customer service departments to visit customer sites unless the sales volume or sales level is substantial.

When a potential or existing customer seeks product or service support, he or she is typically seeking information regarding the use of a product or the manner in which to obtain a service. Based upon the request, the sales or service department provides verbal assistance or sends the customer literature regarding the requested information. The literature is typically mailed to the customer or, if a quick turnaround was required, the information is Faxed or delivered overnight to the customer.

With the creation and increased popularity of the Internet, many companies are providing sales and support information on-line via a web server. Customers may access the web server via the Internet using a browser to seek and obtain both sales and service information. Typically, the company sets up a website that includes an organizational structure to assist the customer in finding desired information. However, for many customers, the website provides a maze of information through which the customer cannot navigate without assistance. Thus, company website typically also provides the customer with the ability to send email questions to the company or request that a customer service representative calls the customer.

Even when a customer service representative calls the customer, however, difficulties still exist. For example, when the customer service representative directs the customer to an appropriate web page or other resource available on the web server, the resource may still be too complicated for the customer to understand by him or herself. In this situation, the customer is therefore left without adequate customer service and may forego further business with the company unless the customer receives a visit from a salesperson or customer support person.

Thus, there is a need in the art for a system that adequately services the needs of a prospective or existing customer, such system operating to benefit not only the customer but to minimize the cost of providing the customer service or sales support.

SUMMARY OF THE INVENTION

Thus, to overcome the shortcomings of the prior systems, among other shortcomings, a web based agent backed system constructed according to the present invention provides sales and service and sales support for a company. The system includes a call center computer coupled to the Internet (or another packet switched network) that receives a call request from a customer computer. The customer computer may have made the call request using a link contained in a company web page maintained on a web server. Upon receiving the call request, the call center computer determines customer information and call information. The call information indicates whether the customer computer is placing an Internet Protocol (IP) telephony call to an agent, requesting that an agent place an IP telephony call to the customer or requesting that an agent place a Public Switched Telephone Network (PSTN) call to the customer.

In servicing the call request, the call center computer contacts an agent station computer and requests an agent. If the customer computer has placed an IP telephony call, the call center computer directs the agent station computer to complete the call to an appropriate agent. An agent in this context is not limited to a person, it could also be an automatic response system. If the customer computer has requested that an agent call, the call center computer forwards information to the agent station computer that is used to place the call and to connect an appropriate agent.

When the call center computer services the call request, it may direct media content to the customer based upon customer information collected either from the current session or prior session(s). The media content is intended to further the business interests of the company. Thus, the media content relates to the products and/or services of the company. Alternately, the media content may simply educate the customer regarding usage of the company's products. Moreover, the media content may be paid advertising that has been selected based upon the customer information or information gathered during prior interaction with the customer.

The media content may include web page content, streamed multimedia content or other types of content that may be displayed/presented on the customer computer. In one operation, the call center computer interacts with software contained on the customer computer to cause the customer computer to request the media content. The media content may be requested and received from a web server, streaming multimedia server, or another computer coupled to the customer computer via a computer network.

Once the agent/customer call has been established, the agent may direct media content to the customer. In one operation, the agent may use the media content to assist in explaining use or service of a product. In another operation, the agent may direct the customer to another product that the agent considers commensurate to the customer's needs. In directing the media content to the customer computer, with consent from the customer, the agent may enact operation of the customer computer via the agent station computer to retrieve a web page from the web server or a multimedia stream from the streaming multimedia server. Alternately, the agent may direct the web server or streaming multimedia server to direct the media content to the customer computer.

Moreover, other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
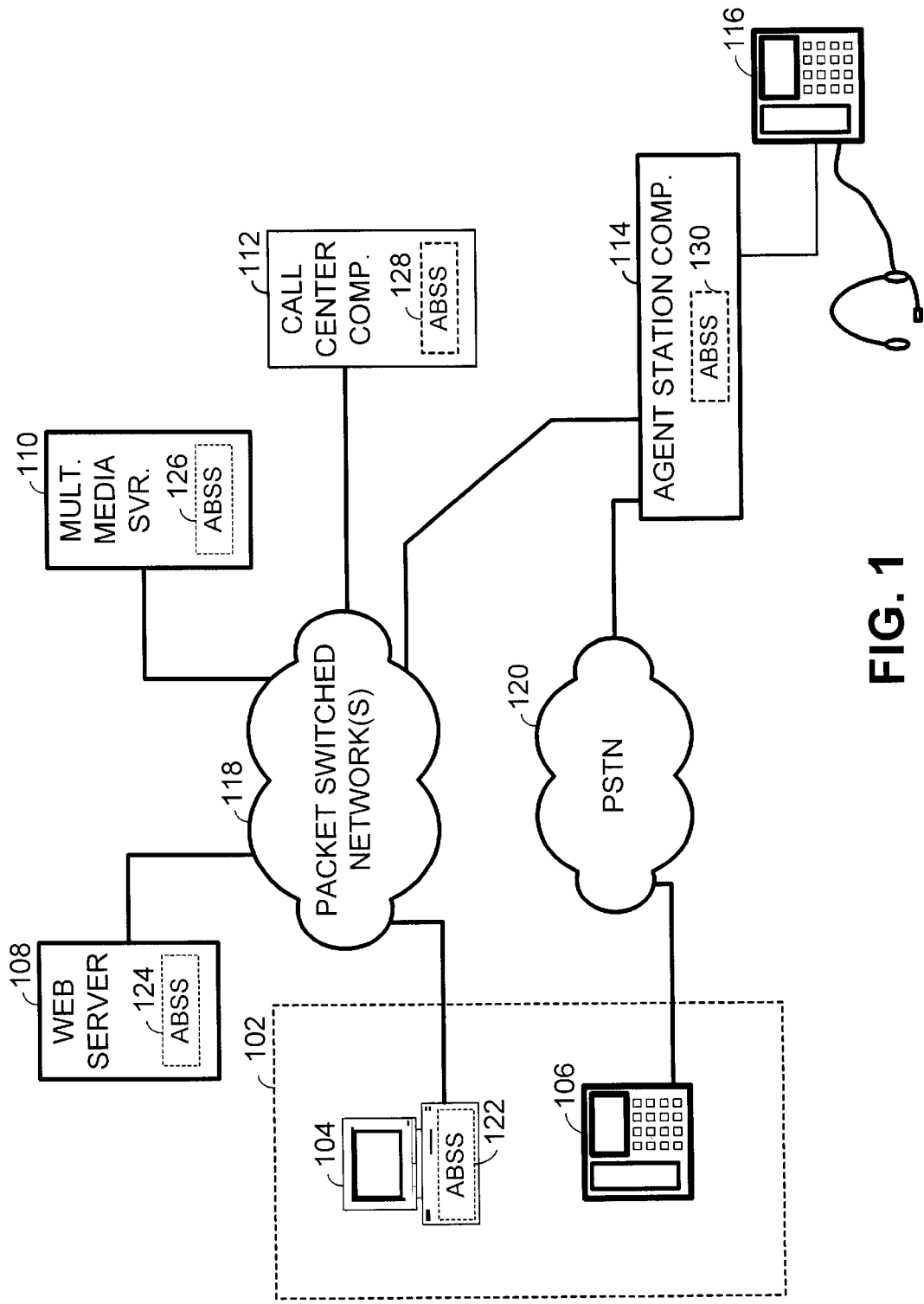
FIG. 1 is a system diagram illustrating a system that provides web based agent backed services with streaming multimedia support according to the present invention.

FIG. 1 is a system diagram illustrating a system that provides web based agent backed services with streaming multimedia support according to the present invention. A customer site 102 includes a customer computer 104 and a telephone 106 that provide an interface for a customer receiving the agent backed services from a company. The company equipment includes a web server 108, a streaming multimedia server 110, a call center computer 112 and an agent station computer 114. Each of these company components may support a single company or may support multiple companies.

The customer computer 104, the web server 108, the streaming multimedia server 110, the call center computer 112 and the agent station computer 114 all couple to one or more packet switched networks 118. These packet switched networks 118 include the Internet and may include Intranets, Local Area Networks, Wide Area Networks and other types of packet switched networks. The packet switched networks 118 may operate according to the Internet Protocol (IP), which is a standardized protocol that supports interconnectivity of computers, worldwide. Thus, the packet switched networks 118 service the packet-based interconnectivity requirements of the components. The agent station computer 114 also couples to the Public Switched Telephone Network (PSTN) 120 and may couple an agent's phone 116 to the customer's telephone 106 via the PSTN 120.

As is generally known, web servers store web pages and other content that may be accessed by the customer computer 104 for downloading and viewing. In the present embodiment, the web server 108 stores web pages and other content relating to the companies. For example, a company that sells copiers may use the web server 108 to store content on using the copiers it sells, content on servicing the copiers it sells, and other content specific to the copiers it sells. In another example, a company that sells software may use the web server 108 to store downloadable applets, patches, updates, errata sheets, and application notes for the software it sells and licenses.

The streaming multimedia server 110 stores multimedia content that may be accessed by customers. The content stored on the streaming multimedia server 110 also relates to the companies which the system services. In the example of the copier company, the streaming multimedia server 110 may store audio/video information on the use or maintenance of its copiers. The streaming multimedia server 110 supports the download of this audio/video information to customers requiring the information. In the case of the software company, the streaming multimedia server 110 may store multimedia tutorials relating to the use of the software.

The call center computer 112 services customer call requests. The call center computer 112 services IP telephony calls via the packet switched networks 118 between the customer and an agent's phone 116. Further, the call center computer 112 services PSTN calls between the customer and the agent's phone 116 via the PSTN 120. In one operation, the customer initiates an IP telephony call to an agent via the call center computer 112. The call center computer 112 then directs the agent station computer 114 to assign an agent (via the agent's phone 116) to service the call and to complete the call. In another operation, the customer requests that an agent calls him or her, but the customer does not initiate the call. In this case, the call center computer 112 collects information from the customer computer 104 that will be used in setting up and servicing the call. This information includes whether the call is to be an IP telephony call or a PSTN call (to telephone 106), the IP telephony address or PSTN telephone number, and additional information that will assist the agent's phone 116 in servicing the call. The agent's phone 116 may then place the call via the packet switched networks 118 or the Public Switched Telephone Network (PSTN) 120, as the case may be, and service the customer.

According to the present invention, agent backed service software (ABSS) is deployed in the customer computer 104, the web server 108, the streaming multimedia server 110, the call center computer 112 and the agent station computer 114 to enable operation according to the present invention. As is shown, ABSS 122 is deployed in the customer computer 104, ABSS 124 is deployed in the web server 108, ABSS 126 is deployed in the streaming multimedia server 110, ABSS 128 is deployed in the call center computer 112 and ABSS 130 is deployed in the agent station computer 114.

The ABSS 122, 124, 126, 128 and 130 directs operation of the respective components according to the present invention. The ABSS 122–130 as a whole performs the operations described herein (as well as other related operations) and as described herein is embodied as software instructions executed by general-purpose hardware. However, in other embodiments within the scope of the present invention, specialized hardware or a combination of specialized hardware and software instructions may perform the functions described herein. Further, while operations described herein relate to particular hardware components, these operations may be performed, in other embodiments, by different hardware components without departing from the scope of the present invention.

In operation according to the present invention, agent backed services allow agents to provide multimedia content to the customer via the customer computer 104 while providing telephone support. In an example of this operation, a customer initially seeks product support from the company. As an initial action, the customer accesses the company's web page(s) via the web server 108. However, the customer has difficulty in answering his or her questions from the content of the web pages without further assistance, or needs further clarification on the information presented. Thus, the customer executes a command contained on one of the web pages requesting telephone contact with an agent.

The customer computer 104 then initiates an IP telephony call to the call center computer 112, which sets up the call with the agent's phone 116 via the agent station computer 114. While setting up the call, the call center computer 112 directs the streaming multimedia server 110 to send multimedia advertising to the customer. Then, the agent station computer 114 connects an agent to the customer and the agent's phone 116 establishes a dialogue with the customer. During this dialogue, the agent may push additional multimedia content to the customer using the streaming multimedia server 110 via the ABSS 122 contained on the customer computer 104. This multimedia content assists the agent in providing sales and customer support. Further, the agent's phone 116 may also push web page content to the customer from the web server 108 via the ABSS 122 contained on the customer computer 104. In these scenarios, the ABSS 130 contained on the agent station computer 114 and operated by the agent's phone 116 interacts with the ABSS 122 contained on the customer computer 104 so that the customer computer 104 may receive the streamed multimedia or web page content without any customer action. These operations are also supported for calls placed by agents.

Figure 2:
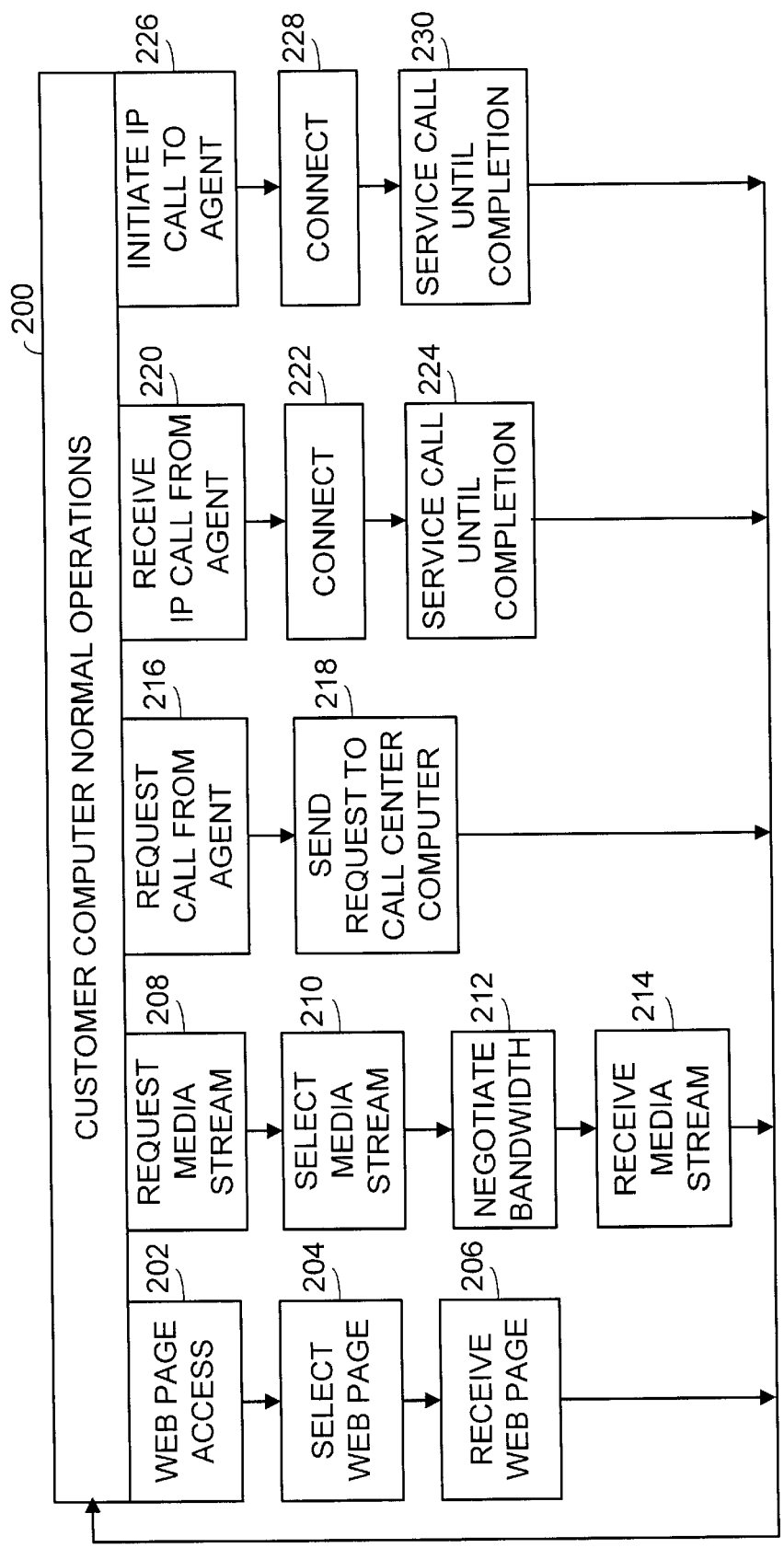
FIG. 2 is a logic diagram illustrating operation of a customer computer 104 according to the present invention.

FIG. 2 is a logic diagram illustrating operation of a customer computer 104 according to the present invention. The customer computer 104 provides many functions in addition to those provided according to the present invention. Thus, the operations described with reference to FIG. 2 relate to operations according to the present invention only. In a first operation, a customer accesses the web server 108, requesting a specific web page (step 202). The domain name for a company home web page may be provided in company literature and used by the customer to access content stored on the web server 108. From the company home page, the customer may access a customer service/sales home page. Alternately, the customer may access this page directly. In accessing web pages, the customer selects a web page (step 204), the web server 108 receives and services the request, and the customer receives the web page at his computer 104 (step 206).

The customer may also request a multimedia stream (step 208). The multimedia stream may be accessed via a web link displayed on a web page. The customer then selects the multimedia stream that he or she desires (step 210). The streaming multimedia server 110 then services the request by first setting up a streaming link with the customer computer 104. In setting up the streaming link, the streaming multimedia server determines what bandwidth the customer computer 104 may dedicate to receiving the multimedia stream, the bandwidth supported across the packet switched network 118 to the customer computer 104, and additional information that is required to service the streaming multimedia operation. The customer computer 104 and the streaming multimedia server then negotiate a bandwidth for the transaction (step 212). The customer computer 104 then receives the multimedia stream (step 214). During delivery of the multimedia stream, The available bandwidth may change due to a change in the available connection bandwidth between the streaming multimedia server 110 and the customer computer 104. When this operating condition occurs, the streaming multimedia server 110 adjusts the multimedia stream bandwidth to compensate. In adjusting the bandwidth, the streaming multimedia server 110 may adjust the frame size, frame resolution, frame update rate, and other parameters that would alter the consumed bandwidth.

According to the present invention, the customer may either place an IP call to an agent or send a message to the call center computer 112, requesting that an agent call. In requesting an agent to call, the customer may request that the agent call using an IP telephony connection to the customer computer 104 or a PSTN connection to the telephone 106. In making a request for an agent to call (step 216), the customer computer 104 sends a request to the call center computer 112 (step 218). Contained in the call request is customer information that is required and useful in servicing the request. The customer information will include the manner in which the call is to be made, e.g., IP telephony call vs. PSTN call, IP address, PSTN number, etc., as well as information relating to the customer's query. This information includes a customer's information, the types of products in which the customer is interested, the web pages the customer has visited, the multimedia content the customer has received, and additional information that will be useful in servicing the customer.

The customer computer 104 may receive an IP telephony call from an agent's phone 116 via the agent station computer 114 and the packet switched networks 118 (step 220). When the IP telephony call is received, the customer computer 104 connects the IP telephony call (step 222) and the customer computer 104 services the call until completion (step 224). During this agent call, the customer computer 104 may also interact with the agent station computer 114 to request and receive web page content and multimedia content. This content assists the agent in servicing the customer and may be "pushed" to the customer via the ABSS 122 contained on the customer computer 104 without any action by the customer.

In another operation, the customer initiates an IP telephony call to an agent via the customer computer 104 (step 226). In this operation, the customer computer 104 sends a call request to the call center computer 112. The call center computer 112 operates to complete the IP telephony call between the customer computer 104 and the agent's phone 116 coupled to the agent station computer 114 (step 228). The customer computer 104 then services the IP telephony call until completion (step 230).

Figure 3:
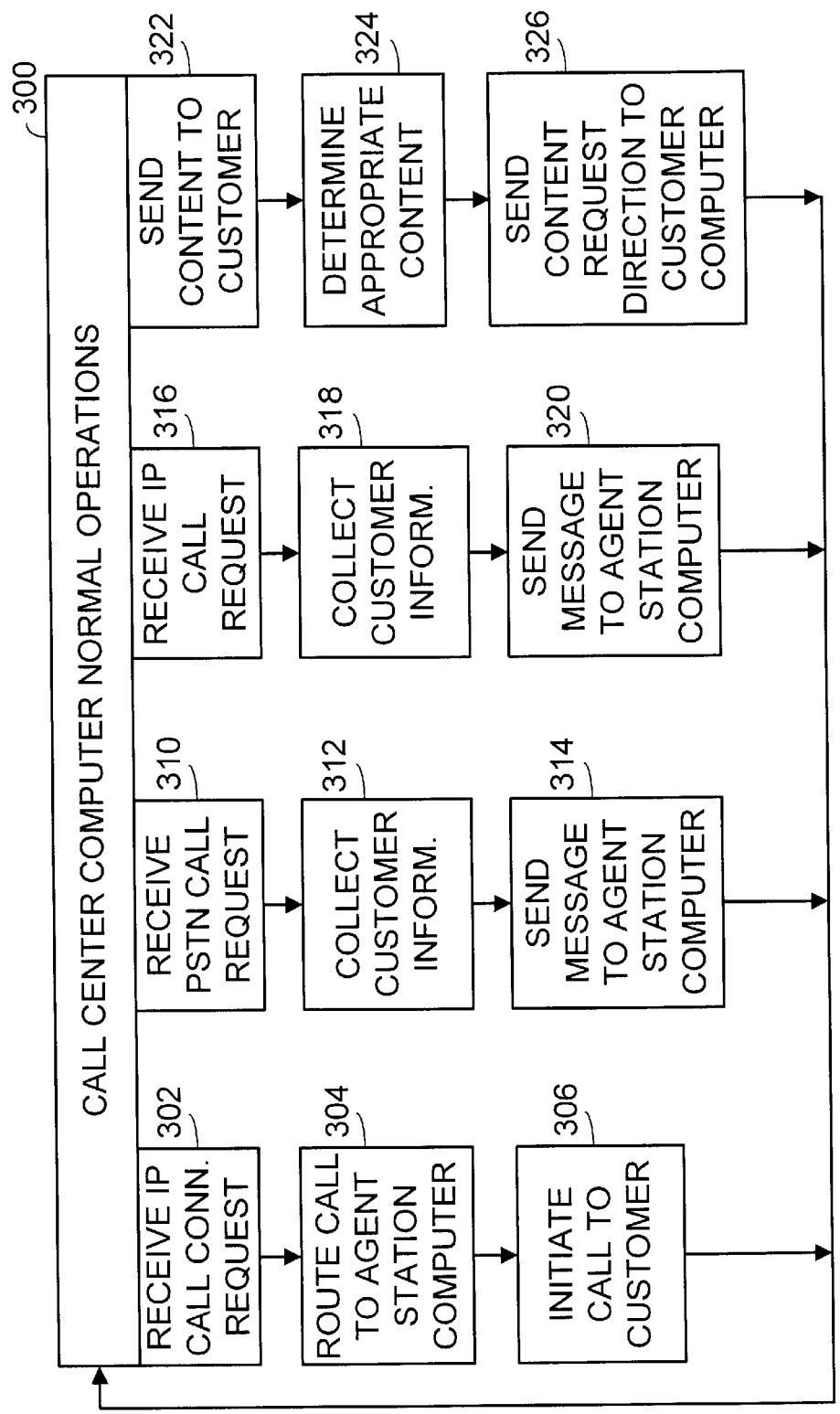
FIG. 3 is a logic diagram illustrating operation of a call center computer 112 according to the present invention.

FIG. 3 is a logic diagram illustrating operation of a call center computer 112 according to the present invention. In a normal operating state (step 300), the call center computer 112 performs normal operations. The particular operations described with reference to FIG. 3 are in addition to other operations that the call center computer 112 provides, such operations generally known in the art.

In a first operation according to the present invention, the call center computer 112 receives an IP call connection request from a customer computer 104 (step 302). In response, the call center computer 112 also completes the call to the agent station computer 114 (step 304) which connects the call to an agent's phone 116. During call setup, the call center computer 112 sets up the call with the customer computer 104 (306). With the call completed, the call center computer 112 may remain in the call path to monitor the duration of the call. However, in another operation, the call center computer 112 releases the call to the agent station computer 114. While setting up the call, the call center computer 112 may stream media content to the customer computer 104. This media content may include advertising, product or service information relating to the subject matter of the customer's access, or other information that would induce the customer to do business with the company.

In another operation according to the present invention, the call center computer 112 receives a request from the customer computer 104 for an agent to call the customer via the PSTN (step 310). In response to this request, the call center computer 112 collects customer information (step 312), such customer information including the customer's identity, customer preferences, the customer's telephone number, calling time preferences, e.g., immediately, at a certain time, etc., and other information that will be useful in servicing the customer's request. The call center computer 112 then assigns an agent (step 314) at the appropriate time and provides the customer information to the agent that the agent may use in placing and servicing the call.

In still another operation according to the present invention, the call center computer 112 receives a request from a customer for an agent to call the customer using an IP telephony connection (step 316). In response to this request, the call center computer 112 collects customer information (step 318), such customer information including the customer's identity, customer preferences, the customer's IP telephony address, calling time preferences, e.g., immediately, at a certain time, etc., and other information that will be useful in servicing the customer's request. The call center computer 112 then assigns an agent at the appropriate time and provides the customer information to the agent (step 320) that the agent may use in placing and servicing the call.

While servicing call requests, the call center computer 112 may direct the streaming multimedia server to stream multimedia content or web page content to the customer computer 104 (step 322). The content may be content relating to the product or service being provided, or otherwise relate to the customer's business. In this operation, the call center computer 112 determines the appropriate content for delivery, the content residing upon the web server 108 or the multimedia server 110 (step 324). Then, the call center computer 112 interacts with the ABSS 122 contained in the customer computer 104, directing the customer ABSS 122 in the customer computer 104 to request a multimedia stream from the streaming multimedia server 110 or a web page from the web server 108 (step 326). In response, the ABSS 122 on the customer computer 104 sets up and services the media stream transaction/web page access transaction.

Figure 4:
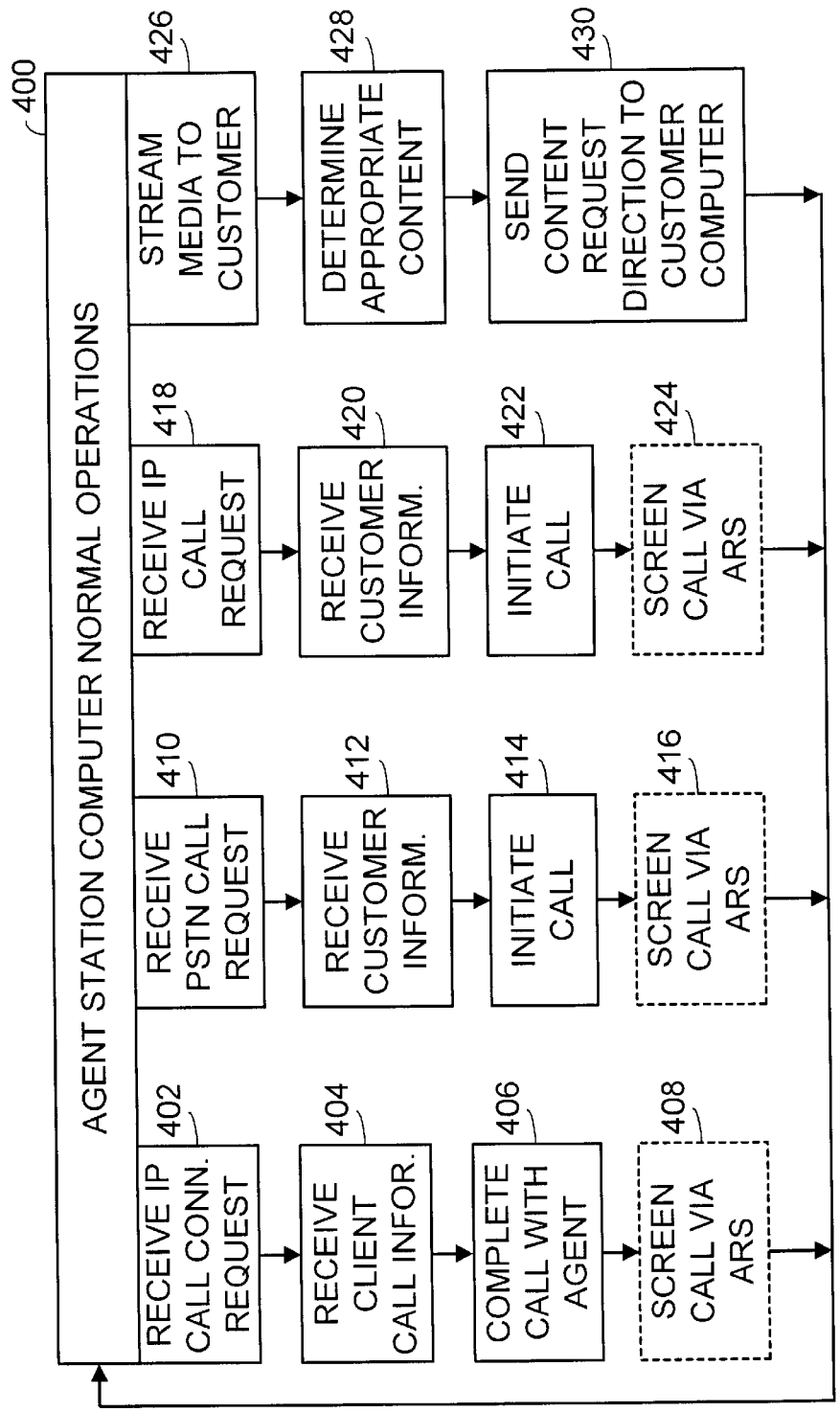
FIG. 4 is a logic diagram illustrating operation of an agent station computer constructed according to the present invention.

FIG. 4 is a logic diagram illustrating operation of an agent station computer 114 constructed according to the present invention. In a normal operating state (step 400), the agent station computer 114 performs normal operations. The particular operations described with reference to FIG. 4 are in addition to other operations that the agent station computer 114 provides, such operations generally known in the art.

In a first operation according to the present invention, the agent station computer 114 receives an IP call connection request from the call center computer 112 (step 402). The agent station computer 114 then receives customer information (step 404), the customer information including the customer's identity, customer preferences, the customer's IP telephony number, calling time preferences, e.g., immediately, at a certain time, etc., and other information that will be useful in servicing the customer's request. An agent is then assigned and the agent station computer 114 completes the call between the customer computer 104 and the agent's phone 116 (step 406). The call may optionally be screened using an automatic response system (ARS) that is executing on the agent station computer 114 (step 408). The ARS processes the customer request and, if the customer is satisfied, the call is not sent to an agent.

In another operation according to the present invention, the agent station computer 114 receives a request from the call center computer 112 to place a call via the PSTN to a customer (step 410). In response to this request, the agent station computer 114 receives customer information from the call center computer 112 (step 412), the customer information including the customer's identity, customer preferences, the customer's PSTN telephone number, calling time preferences, e.g., immediately, at a certain time, etc., and other information that will be useful in servicing the customer's request. The agent station computer 114 then initiates the call between the agent and the customer at the appropriate time (step 414). This PSTN call may be routed through the agent station computer 114 so that the call duration may be monitored. If an ARS services the call instead of an agent, the call is completed to the ARS and, may optionally not be connected to the agent (step 416).

In yet another operation according to the present invention, the agent station computer 114 receives a request from the call center computer 112 to place an IP telephony call to a customer (step 418). In response to this request, the agent station computer 114 receives customer information from the call center computer 112 (step 420), such customer information including the customer's identity, customer preferences, the customer's IP telephony address and calling time preferences. The agent station computer 114 then initiates the call between the agent 116 and the customer computer 104 at the appropriate time (step 422). The IP telephony call will be between the agent station computer 114 and the customer computer 112 since the voice over packet network capability resides on the agent station computer 114 and the call duration can be measured in parallel with call servicing. The call may optionally be screened using the ARS that is executing on the agent station computer 114 (step 424). If the customer is satisfied by the ARS, the call is not sent to an agent.

While servicing calls, the agent may direct (via the agent station computer 114) the customer computer 104 to request content from the web server 108 or the streaming multimedia server 110 (step 426). The content may be advertising content, content relating to the product or service support being provided, or otherwise relate to the customer's business. In this operation, the agent determines the appropriate content for delivery, the content residing upon the web server 108 or the multimedia server 110 (step 428). The agent station computer 114 or the call center computer 112 may assist the agent in selecting content. With the content selected, the agent station computer 114 then interacts with the ABSS 122 contained on the customer computer 104, directing the ABSS 122 on the customer computer 104 to request a multimedia stream from the streaming multimedia server 110 or a web page from the web server 108 (step 430). In response, the ABSS 122 on the customer computer 104 sets up and services the media stream transaction/web page access transaction.

Figure 5:
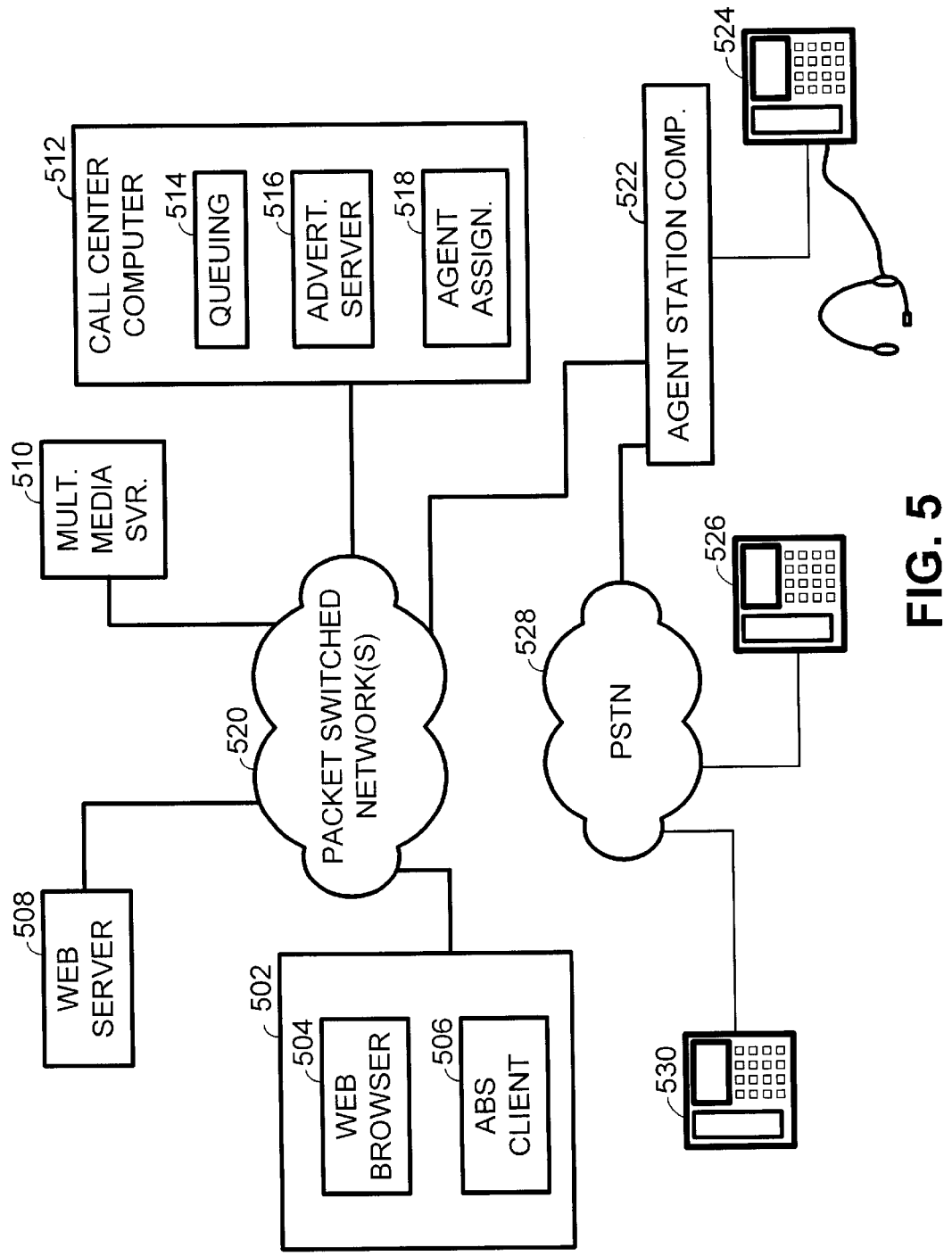
FIG. 5 is a block diagram generally illustrating the functional components of a system constructed according to the present invention.

FIG. 5 is a block diagram generally illustrating the functional components of a system constructed according to the present invention. As was previously described with reference to FIG. 1, ABSS resides upon a plurality of computers—on a customer computer 502, on a web server 508, on a streaming multimedia server 510, on a call center computer 512 and on an agent station computer 522. The customer site includes a telephone 530 coupled to the PSTN 528. The customer computer 502, the web browser 508, the streaming multimedia server 510, the call center computer 112 512 and the agent station computer 522 all couple to at least one packet switched network 520. The agent station computer 522 also couples to the PSTN 528. Agent telephones 524 and 526 operate to service calls via both the packet switched networks 520 and the PSTN 528. The call center computer 512 includes queuing functions 514, advertisement server functions 516 and agent assignment functions 518.

In a first example of operation according to the present invention, a customer accesses the company's web page located on web server 508 using the web browser 504 operating upon the customer computer 502. In response to the web page request, the web server 508 provides the requested web page to the customer computer 502. In viewing the web page, the customer desires to speak with a company agent and clicks a "call for assistance" button on a displayed web page. Based upon the request, the ABS client 506 initiates an IP telephony call to the call center computer 512 via the packet switched networks 520.

Upon receipt of the IP telephony call request from the customer computer, the queuing function 514 in the call center computer 512 receives the call request that includes customer information regarding the call. Then, the queuing function 514 queries agent assignment 518 for an available agent. If an agent is available, the call is passed immediately to a selected agent station 522 (and on to a selected agent). If an agent is not available, the call is queued until an agent becomes available.

While the customer is waiting for the agent to become available, the advertising server 516 selects content that is to be received upon the customer computer 502. This selection is made based upon the web page from which the customer initiated the call, the identity of the customer and additional information collected relating to the customer's history with the company. With the selection made, the advertising server 516 sends a content delivery request to the ABS client 506 on the customer computer 502. In response to this request, the ABS client 506 requests the content from the web server 508 or the streaming multimedia server 510. In response, the streaming multimedia server sets up a media stream with the ABS client 506 on the customer computer 502 and commences streaming the multimedia content and/or the web server 508 provides the requested web page to the web browser 504. In alternate operation, the advertising server 516 sends a content delivery request to the web server 508 or streaming multimedia server 510, which delivers the content to the customer computer 502 using "web push" technology.

The agent station computer 522 then connects the call to the agent via telephone 524. The agent station computer 522 apprises the agent of the customer information, the content that has been provided to the customer and then connects the agent to the customer. The agent may then establish a dialogue with the customer to assist the customer. Based upon the dialogue, the agent determines that the customer requires additional information regarding a supported product. The agent then either directs the customer to a particular resource stored on the streaming multimedia server 510 or a particular web page stored on the web server 508. The customer may then commence downloading of the web page or streaming of the multimedia content. During receipt of this content, the agent may then assist the customer in receiving desired information and to explain the information that is received.

Content delivery operations may be performed with or without customer action. In an action that requires no customer action, the agent "pushes" multimedia content or web page content to the customer. In this operation, the agent, via an agent station computer 522, selects multimedia content or web page content for the customer to receive. The agent then initiates delivery of the content to the customer computer 502 via the ABS client 506. Thus, without any additional action by the customer, the customer receives additional content relating to the company. This additional content may assist the customer in using a product or in selecting a product to purchase. In this fashion, the agent can actually affect the buying decision of the customer by providing a multimedia product presentation while explaining the content of the presentation.

Still referring to FIG. 5, in an alternate operation, the customer accesses the company's web page. However, instead of initiating an IP telephony call, the customer clicks a "call me back" button on a web page of the company. By clicking this button, the ABS client 506 collects customer information and sends a message to the call center computer 512, requesting that an agent call the customer via the PSTN. Upon receipt of the PSTN telephony call request from the customer computer, the queuing function 514 in the call center computer 512 receives the call request and receives customer information regarding the call. Then, the queuing function 514 sends a call request to the agent station computer 522 when an agent is available, and sends a message to the customer indicating that an agent will be available shortly.

While the customer is waiting for the agent, the advertising server 516 selects multimedia content that is to be sent to the customer computer. This selection is made as was previously described. The agent station computer 522, upon receiving the call assignment, makes the call through the PSTN 528 connecting the telephone 530 and the telephone 524. Prior to completing the connection, the agent station computer 522 then apprises the agent of the customer information, the content of the multimedia stream that has been provided to the customer and then connects the agent to the customer. The agent station computer 522 dials the customer's telephone 530 via the PSTN 528 and the agent via telephone 524 establishes a dialogue with the customer to assist the customer. Based upon the dialogue, the agent determines that the customer requires additional information regarding a supported product. The agent then either directs the customer to a particular multimedia resource stored on the streaming multimedia server 510 or to a particular web page stored on the web server 508. The customer may then commence downloading of the web page or streaming of the multimedia content. The agent may also push content to the customer. Alternatively, the agent may push content to the customer computer 502.

Figure 6:
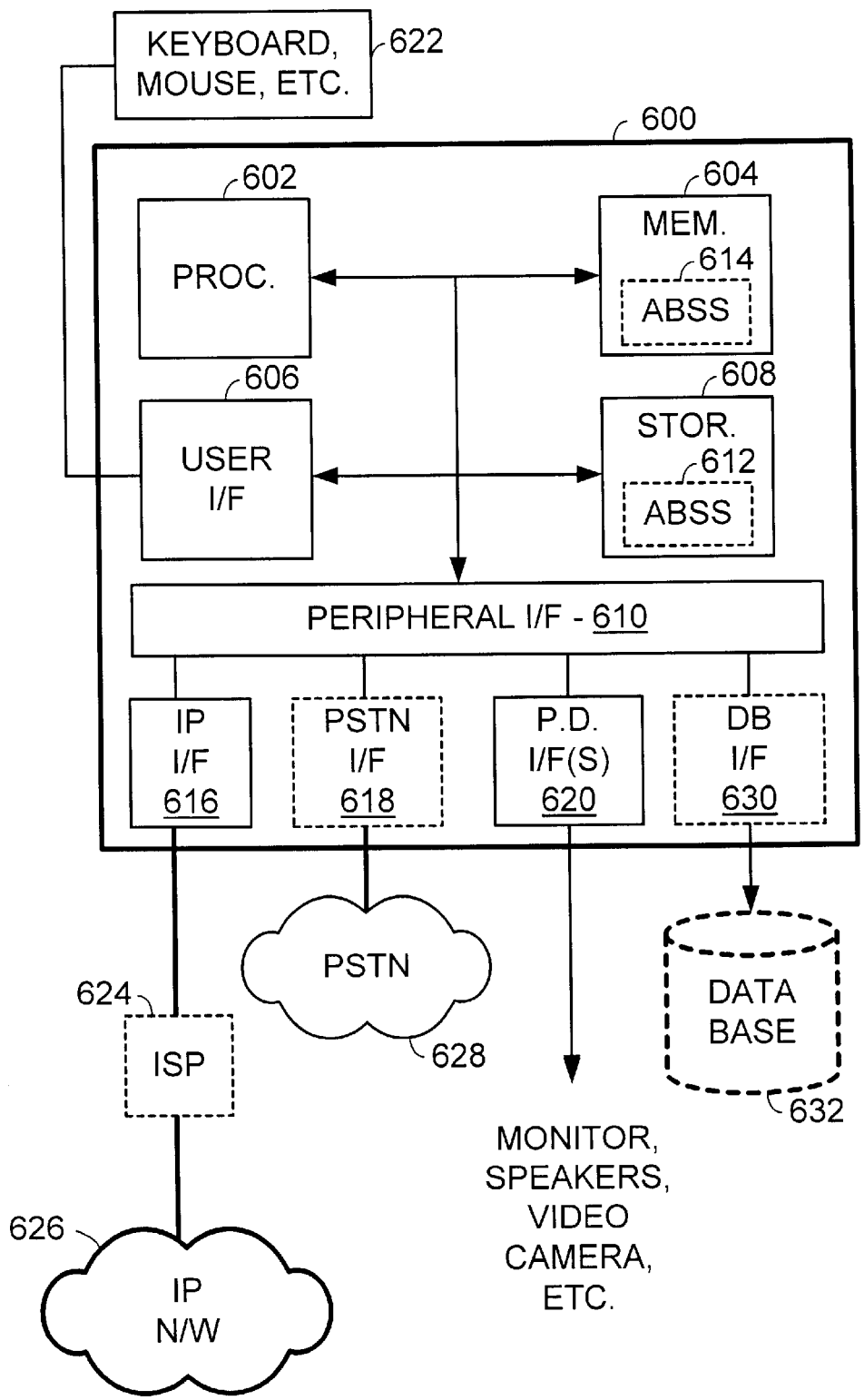
FIG. 6 is a block diagram illustrating a computer constructed according to the present invention that may perform customer, call center computer, agent station computer or streaming media functions.

FIG. 6 is a block diagram illustrating a computer 600 constructed according to the present invention that is the same, or similar to, the construction of the customer computer 104, the call center computer 112, the agent station computer 114 or the streaming media server 110. The computer 600 may be general-purpose computer that has been programmed and/or otherwise modified to perform the particular operations described herein. However, the computer 600 may be specially constructed to perform the operations described herein.

The computer 600 includes a processor 602, memory 604, a customer interface 606, storage 608 and a peripheral interface 610, all of which couple via a processor bus. The processor 602 may be a microprocessor or another type of processor that executes software instructions to accomplish programmed functions. The memory 604 may include DRAM, SRAM, ROM, PROM, EPROM, EEPROM or another type of memory in which digital information may be stored. The storage 608 may be magnetic disk storage, magnetic tape storage, optical storage, or any other type of device, which is capable of storing digital instructions and data. The customer interface 606 couples to devices 622, which allow a customer to interface with the Computer 600. The devices 622 may include a keyboard, a mouse, a joystick, etc.

The peripheral interface 610 couples to a packet switched network interface 616, a peripheral device interface 620 and may couple to a PSTN interface 618 and to a database interface 630, depending upon the embodiment. The devices interface 620 couple the computer 600 to a monitor, speakers, microphone, video camera, and/or other input/output devices. The packet switched network interface 616 couples the computer 600 to the packet switched network 626. Coupling to the packet switched network 626 may be via an Internet Service Provider (ISP) 624 as illustrated. Thus, the packet switched network interface 616 may be a voice modem, an ISDN modem, a DSL modem, a cable modem or another device supporting the connection. The database interface 630 couples the computer 600 to a database 632. This database may store web pages, multimedia files or other content, depending upon the embodiment. In an alternate connectivity, the database 632 couples to the computer 600 via the IP I/F 616.

ABSS software 612 is loaded into the storage 608 of the computer 600. Upon its execution, a portion of the ABSS software 612 is downloaded into memory 604 (as ABSS software 614). The processor 602 then executes the ABSS software 614 instructions to perform the operations described herein. The programming and operation of digital computers is generally known to perform such steps. Upon execution of the ABSS software 614, the computer 600 functions as the customer computer 104, the web server 108, the streaming multimedia server 110, the call center computer 112 or the agent station computer 114, as previously discussed herein with reference to FIGS. 1 through 5.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method of providing agent backed web based support to a customer, the method comprising:
   receiving a call request from a customer computer via a computer network;
   receiving customer information via the computer network;
   in response to the call request, requesting that a call be completed between the customer and an agent;
   based upon the customer information, providing media content to the customer computer via the computer network;
   temporarily completing the call to an Automatic Response System (ARS); screening the call using the ARS;
   when screening the call using the ARS does not satisfy the customer, completing the call to the agent; and
   when screening the call using the ARS satisfies the customer, terminating the call.

2. The method of claim 1, wherein:
   receiving the call request comprises receiving an Internet Telephony call from the customer computer; and
   requesting that a call be completed between the customer and an agent comprises completing the Internet Telephony call to the agent.

3. The method of claim 1, wherein:
   receiving the call request comprises receiving a request for the agent to make an Internet Telephony call to the customer computer; and
   requesting that a call be completed between the customer and an agent comprises requesting that the agent make an Internet Telephony call to the customer computer.

4. The method of claim 1, wherein:
   receiving the call request comprises receiving a request for the agent to make a Public Switched Telephone Network call to the customer computer; and
   requesting that a call be completed between the customer and an agent comprises requesting that the agent make a Public Switched Telephone Network call to the customer's telephone.

5. The method of claim 1, wherein the media content comprises a multimedia stream.

6. The method of claim 1, wherein the media content comprises a web page.

7. The method of claim 1, wherein the media content comprises advertising.

8. The method of claim 1, further comprising, after the call has been established between the customer and an agent, providing media content to the customer computer based upon agent input.

9. A method of receiving agent backed web based support by a customer, the method comprising:
   sending a call request from a customer computer to a call center computer via a computer network;
   sending customer information from the customer computer to the call center computer via the computer network;
   receiving a call from an Automatic Response System (ARS) by the customer in response to the call request;
   the customer interacting with the ARS to allow the ARS to screen the call;
   when screening of the call by the ARS does not satisfy the customer, the customer receiving a call from an agent and receiving media content at the customer computer via the computer network; and
   when screening the call using the ARS satisfies the customer, terminating the call.

10. The method of claim 9, wherein:
    sending the call request comprises initiating an Internet Telephony call to the call center computer; and
    receiving a call from an agent comprises an agent answering the Internet Telephony call.

11. The method of claim 9, wherein:
    sending the call request comprises requesting that an agent make an Internet Telephony call to the customer computer; and
    receiving the call from the agent comprises receiving an Internet Telephony call from the agent at the customer computer.

12. The method of claim 9, wherein:
sending the call request comprises requesting that an agent make a Public Switched Telephone Network call to the customer computer; and
receiving the call from the agent comprises receiving a Public Switched Telephone Network call from an agent at the customer computer.

13. The method of claim 9, wherein the media content comprises a multimedia stream.

14. The method of claim 9, wherein the media content comprises a web page.

15. The method of claim 9, wherein the media content comprises advertising.

16. The method of claim 9, further comprising, after the call has been established between the customer and an agent, receiving media content at the customer computer based upon agent input.

17. A call center computer that supports agent backed web based support to a customer, the call center computer comprising:
a processor;
memory coupled to the processor;
a user interface coupled to the processor;
a network interface coupled to the processor that supports data transmission with a coupled computer network; and
the memory storing a plurality of instructions, the plurality of instructions comprising:
a plurality of instructions that, upon execution by the processor, cause the call center computer to receive a call request from a customer computer via a computer network;
a plurality of instructions that, upon execution by the processor, cause the call center computer to receive customer information via the computer network;
a plurality of instructions that, upon execution by the processor, cause the call center computer to, in response to the call request, request that a call be completed between the customer and an agent;
a plurality of instructions that, upon execution by the processor, cause the call center computer to, based upon the customer information, provide media content to the customer computer via the computer network;
a plurality of instructions that, upon execution by the processor, cause the call center computer to temporarily complete the call to an Automatic Response System (ARS);
a plurality of instructions that, upon execution by the processor, cause the call center computer to screen the call using the ARS;
a plurality of instructions that upon execution by the processor, cause the call center computer to, when screening the call using the ARS does not satisfy the customer, complete the call to the agent; and
a plurality of instructions that, upon execution by the processor, cause the call center computer to, when screening the call using the ARS satisfies the customer, terminate the call.

18. The call center computer of claim 17, wherein the plurality of instructions further comprise:
a plurality of instructions that, upon execution by the processor, cause the call center computer to receive an Internet Telephony call from the customer computer; and
a plurality of instructions that, upon execution by the processor, cause the call center computer to complete the Internet Telephony call to the agent.

19. The call center computer of claim 17, wherein the plurality of instructions further comprise a plurality of instructions that, upon execution by the processor, cause the call center computer to request an agent to make an Internet Telephony call to the customer computer.

20. The call center computer of claim 17, wherein the plurality of instructions further comprise a plurality of instructions that, upon execution by the processor, cause the call center computer to request an agent to make a Public Switched Telephone Network call to the customer computer.

21. The call center computer of claim 17, wherein the media content comprises a multimedia stream.

22. The call center computer of claim 17, wherein the media content comprises a web page.

23. The call center computer of claim 17, wherein the media content comprises advertising.

24. The call center computer of claim 17 wherein plurality of instructions further comprise a plurality of instructions that, upon execution by the processor, cause the call center computer to, after the call has been established between the customer and an agent, provide media content to the customer computer based upon agent input.

25. A customer computer that supports the receipt of agent backed web based support by a customer, the call center computer comprising:
a processor;
memory coupled to the processor;
a user interface coupled to the processor;
a network interface coupled to the processor that supports data transmission with a coupled computer network; and
the memory storing a plurality of instructions, the plurality of instructions comprising:
a plurality of instructions that, upon execution by the processor, cause the customer computer to send a call request to a call center computer via a computer network;
a plurality of instructions that, upon execution by the processor, cause the customer computer to send customer information to the call center computer via the computer network;
a plurality of instructions that, upon execution by the processor, cause the customer computer to receive a call from an Automatic Response System (ARS);
a plurality of instructions that upon execution by the processor, cause the customer computer to allow the customer to interact with the ARS to allow the ARS to screen the call;
a plurality of instructions that, upon execution by the processor, cause the customer computer to, when screening of the call by the ARS does not satisfy the customer, receive a call from an agent and receive media content via the computer network; and
a plurality of instructions that, upon execution by the processor, cause the customer computer to, when screening of the call by the ARS satisfies the customer, terminate the call.

26. The customer computer of claim 25, wherein the plurality of instructions further comprise a plurality of instructions that, upon execution by the processor, cause the customer computer to initiate an Internet Telephony call to the call center computer.

27. The customer computer of claim 25, wherein the plurality of instructions further comprise:
a plurality of instructions that, upon execution by the processor, cause the customer computer to request that an agent make an Internet Telephony call to its computer network address; and a plurality of instructions that, upon execution by the processor, cause the customer computer to receive an Internet Telephony call from the agent.

28. The customer computer of claim 25, wherein the plurality of instructions further comprise a plurality of instructions that, upon execution by the processor, cause the customer computer to request that an agent make a Public Switched Telephone Network call to the customer computer.

29. The customer computer of claim 25, wherein the media content comprises a multimedia stream.

30. The customer computer of claim 25, wherein the media content comprises a web page.

31. The customer computer of claim 25, wherein the media content comprises advertising.

32. The customer computer of claim 25 wherein the plurality of instructions further comprise a plurality of instructions that, upon execution by the processor, cause the customer computer to, after the call has been established between the customer and an agent, receive media content based upon agent input.

33. A computer readable medium that stores a plurality of software instructions that, when executed by a call center computer, causes the call center computer to provide agent backed web based support to a customer, the plurality of software instructions comprising:

a plurality of instructions that, upon execution by the call center computer, cause the call center computer to receive a call request from a customer computer via a computer network;

a plurality of instructions that, upon execution by the call center computer, cause the call center computer to receive customer information via the computer network;

a plurality of instructions that, upon execution by the call center computer, cause the call center computer to, in response to the call request, request that a call be completed between the customer and an agent;

a plurality of instructions that, upon execution by the call center computer, cause the call center computer to, based upon the customer information, provide media content to the customer computer via the computer network;

a plurality of instructions that, upon execution by the call center computer, cause the call center computer to temporarily complete the call to an Automatic Response System (ARS);

a plurality of instructions that, upon execution by the call center computer, cause the call center computer to screen the call using the ARS;

a plurality of instructions that, upon execution by the call center computer, cause the call center computer to, when screening the call using the ARS does not satisfy the customer, complete the call to the agent; and a plurality of instructions that, upon execution by the call center computer, cause the call center computer to, when screening the call using the ARS satisfies the customer, terminate the call.

34. A computer readable medium that stores a plurality of software instructions that, when executed by a customer computer, causes the customer computer to receive agent backed web based support, the plurality of software instructions comprising:

a plurality of instructions that, upon execution by the customer computer, cause the customer computer to send a call request to a call center computer via a computer network;

a plurality of instructions that, upon execution by the customer computer, cause the customer computer to send customer information to the call center computer via the computer network;

a plurality of instructions that, upon execution by the customer computer, cause the customer computer to receive a call from an Automatic Response System (ARS);

a plurality of instructions that, upon execution by the customer computer, cause the customer computer to allow a customer to interact with the ARS to allow the ARS to screen the call;

a plurality of instructions that, upon execution by the customer computer, cause the customer computer to, when screening of the call by the ARS does not satisfy the customer, receive a call from an agent and receive media content via the computer network; and a plurality of instructions that, upon execution by the processor, cause the customer computer to, when screening of the call by the ARS satisfies the customer, terminate the call.

* * * * *